(12) United States Patent
Lehman

(10) Patent No.: US 10,544,930 B2
(45) Date of Patent: Jan. 28, 2020

(54) LIGHTING ASSEMBLY FOR A VEHICLE INTERIOR

(71) Applicant: Motus Integrated Technologies, Holland, MI (US)

(72) Inventor: Philip Allen Lehman, West Olive, MI (US)

(73) Assignee: Daimay North America Automotive Engineering Technology, Inc., Holland, MI (US)

(*) Notice: Subject to any disclaimer, the term of this patent is extended or adjusted under 35 U.S.C. 154(b) by 1 day.

(21) Appl. No.: 15/938,013

(22) Filed: Mar. 28, 2018

(65) Prior Publication Data

US 2018/0283672 A1     Oct. 4, 2018

Related U.S. Application Data

(60) Provisional application No. 62/477,721, filed on Mar. 28, 2017.

(51) Int. Cl.
| | |
|---|---|
| *F21V 23/06* | (2006.01) |
| *B60Q 3/57* | (2017.01) |
| *B60Q 3/252* | (2017.01) |
| *H01R 12/71* | (2011.01) |
| *H01R 12/58* | (2011.01) |
| *H01R 12/70* | (2011.01) |
| *H01R 12/55* | (2011.01) |
| *F21Y 115/10* | (2016.01) |

(52) U.S. Cl.
CPC .............. *F21V 23/06* (2013.01); *B60Q 3/252* (2017.02); *B60Q 3/57* (2017.02); *H01R 12/55* (2013.01); *H01R 12/58* (2013.01); *H01R 12/7052* (2013.01); *H01R 12/714* (2013.01); *F21Y 2115/10* (2016.08); *H01R 12/707* (2013.01)

(58) Field of Classification Search
CPC ........... F21V 23/06; B60Q 3/57; B60Q 3/252; H01R 12/55; H01R 12/58; H01R 12/7052; H01R 12/714; H01R 12/707; F21Y 2115/10
See application file for complete search history.

(56) References Cited

U.S. PATENT DOCUMENTS

| | | | | |
|---|---|---|---|---|
| 2002/0126496 | A1* | 9/2002 | Okano | B60J 3/0282 362/492 |
| 2003/0031010 | A1* | 2/2003 | Sosniak | B60Q 1/50 362/140 |
| 2008/0074866 | A1* | 3/2008 | Barker | B60J 3/0282 362/142 |
| 2014/0286028 | A1* | 9/2014 | Haraguchi | B60J 3/0282 362/492 |
| 2016/0167490 | A1* | 6/2016 | Janowiak | B60J 3/0282 362/511 |
| 2017/0240103 | A1* | 8/2017 | Still | B60Q 3/80 |

* cited by examiner

*Primary Examiner* — Mary Ellen Bowman
(74) *Attorney, Agent, or Firm* — Fletcher Yoder, P.C.

(57) ABSTRACT

A lighting assembly for a vehicle interior includes an electrically conductive connector configured to couple to a circuit board and to electrically couple to a light-emitting diode (LED). The electrically conductive connector is configured to interface with a fuse bulb connector of a fuse bulb mount to couple the lighting assembly to the fuse bulb mount and to electrically couple the LED to the fuse bulb connector, and the electrically conductive connector comprises an interface configured to couple an electrical conductor, separate from the fuse bulb connector, to the electrically conductive connector.

20 Claims, 5 Drawing Sheets

LIGHTING ASSEMBLY FOR A VEHICLE INTERIOR

CROSS-REFERENCE TO RELATED APPLICATION

This application claims priority from and the benefit of U.S. Provisional Application Ser. No. 62/477,721, entitled "LIGHTING ASSEMBLY FOR A VEHICLE INTERIOR," filed Mar. 28, 2017, which is hereby incorporated by reference in its entirety.

BACKGROUND

The disclosure relates generally to a lighting assembly for a vehicle interior.

Many vehicles employ sun visors to shield occupants from sunlight, thereby enabling the occupants to focus on the surrounding environment. For example, certain vehicles include sun visors positioned adjacent to a top portion of the windshield to facilitate access by a driver and/or front passenger. Under certain lighting conditions, a driver may deploy the sun visor (e.g., by rotating the sun visor about a rotational axis from a storage position to a deployed position) to reduce light transmission into the vehicle interior, thereby enabling the driver to focus on vehicle operations.

Certain sun visors include a vanity mirror and a lighting system configured to illuminate a vehicle occupant, thereby enabling the vehicle occupant to view a reflection in the vanity mirror during low light conditions. The lighting system may include a fuse bulb and a mount configured to support and to provide electrical power to the fuse bulb. Alternatively, the lighting system may include a circuit board and a light-emitting diode (LED) mounted to the circuit board (e.g., dedicated LED lighting module). It may be desirable to replace the fuse bulb with an LED fuse bulb. However, the complexity associated with designing and manufacturing an LED fuse bulb replacement and a dedicated LED lighting module may increase the total costs of producing both types of lighting systems.

BRIEF DESCRIPTION

Certain embodiments of the present disclosure relate to a lighting assembly for a vehicle interior including an electrically conductive connector configured to couple to a circuit board and to electrically couple to a light-emitting diode (LED). The electrically conductive connector is configured to interface with a fuse bulb connector of a fuse bulb mount to couple the lighting assembly to the fuse bulb mount and to electrically couple the LED to the fuse bulb connector, and the electrically conductive connector comprises an interface configured to couple an electrical conductor, separate from the fuse bulb connector, to the electrically conductive connector.

DRAWINGS

DETAILED DESCRIPTION

Figure 1:
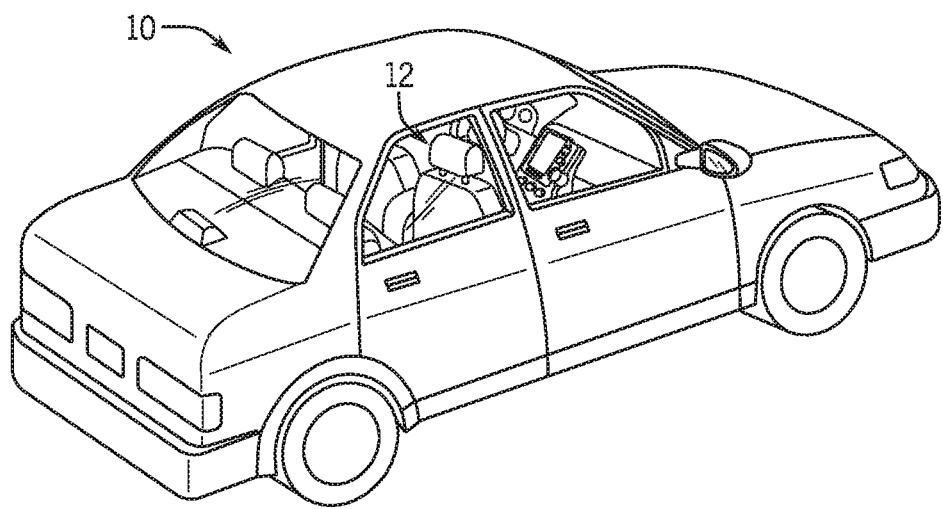
FIG. 1 is a perspective view of an embodiment of a vehicle that may include at least one sun visor assembly having a lighting assembly.

FIG. 1 is a perspective view of an embodiment of a vehicle 10 that may include at least one sun visor assembly having a lighting assembly. In certain embodiments, the vehicle 10 may include sun visors within an interior 12 of the vehicle 10. In such embodiments, the sun visors are configured to shield vehicle occupants from sunlight. Each sun visor may include a vanity mirror and a lighting system configure to illuminate a vehicle occupant, thereby enabling the vehicle occupant to view a reflection in the vanity mirror during low light conditions. In certain embodiments, the lighting system includes a lighting assembly configured to interface with a fuse bulb mount and a lighting assembly mount. In such embodiments, the lighting system includes a circuit board and a light-emitting diode (LED) coupled to the circuit board. The lighting assembly also includes an electrically conductive connector coupled to the circuit board and electrically coupled to the LED. The electrically conductive connector is configured to interface with a fuse bulb connector of the fuse bulb mount to coupe the lighting assembly to the fuse bulb mount and to electrically couple the LED to the fuse bulb connector. Accordingly, the lighting assembly may be disposed within a fuse bulb mount as a replacement for an incandescent fuse bulb. In addition, the electrically conductive connector includes an interface (e.g., slot within the electrically conductive connector) configured to couple an electrical conductor to the electrically conductive connector. Accordingly, the lighting assembly may be disposed within a lighting assembly mount particularly configured to retain the lighting assembly, and the electrical conductor may be connected to the electrically conductive connector via the interface (e.g., slot) to provide electrical power to the lighting assembly. Therefore, the lighting assembly may be used both as a replacement for an incandescent fuse bulb and as a dedicated LED lighting module. As a result, the costs and complexity associated with designing and manufacturing an LED fuse bulb replacement and a dedicated LED lighting module may be substantially reduced.

Figure 2:
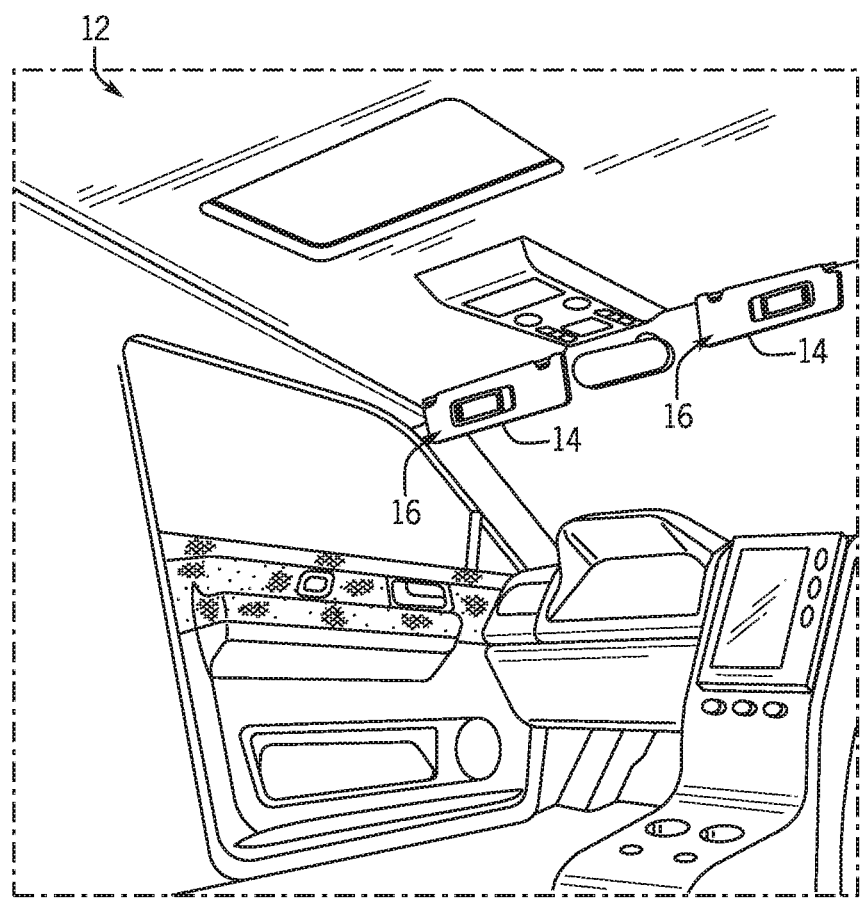
FIG. 2 is a perspective view of a part of the interior of the vehicle of FIG. 1.

FIG. 2 is a perspective view of a part of the interior 12 of the vehicle 10 of FIG. 1. As illustrated, the vehicle interior 12 includes a sun visor assembly 14 having a lighting system 16. As previously discussed, the lighting system 16 includes a lighting assembly configured to interface with a fuse bulb mount and a lighting assembly mount, thereby enabling the lighting assembly to be used both as a replacement for an incandescent fuse bulb and as a dedicated LED lighting module. Accordingly, the costs and complexity associated with designing and manufacturing an LED fuse bulb replacement and a dedicated LED lighting module may be substantially reduced. While the lighting assembly is disclosed herein with reference to a sun visor, it should be appreciated that in certain embodiments, the lighting assembly may be used within other components of the vehicle interior, such as a door panel, an instrument panel, a center console, or a combination thereof, among other vehicle interior components.

Figure 3:
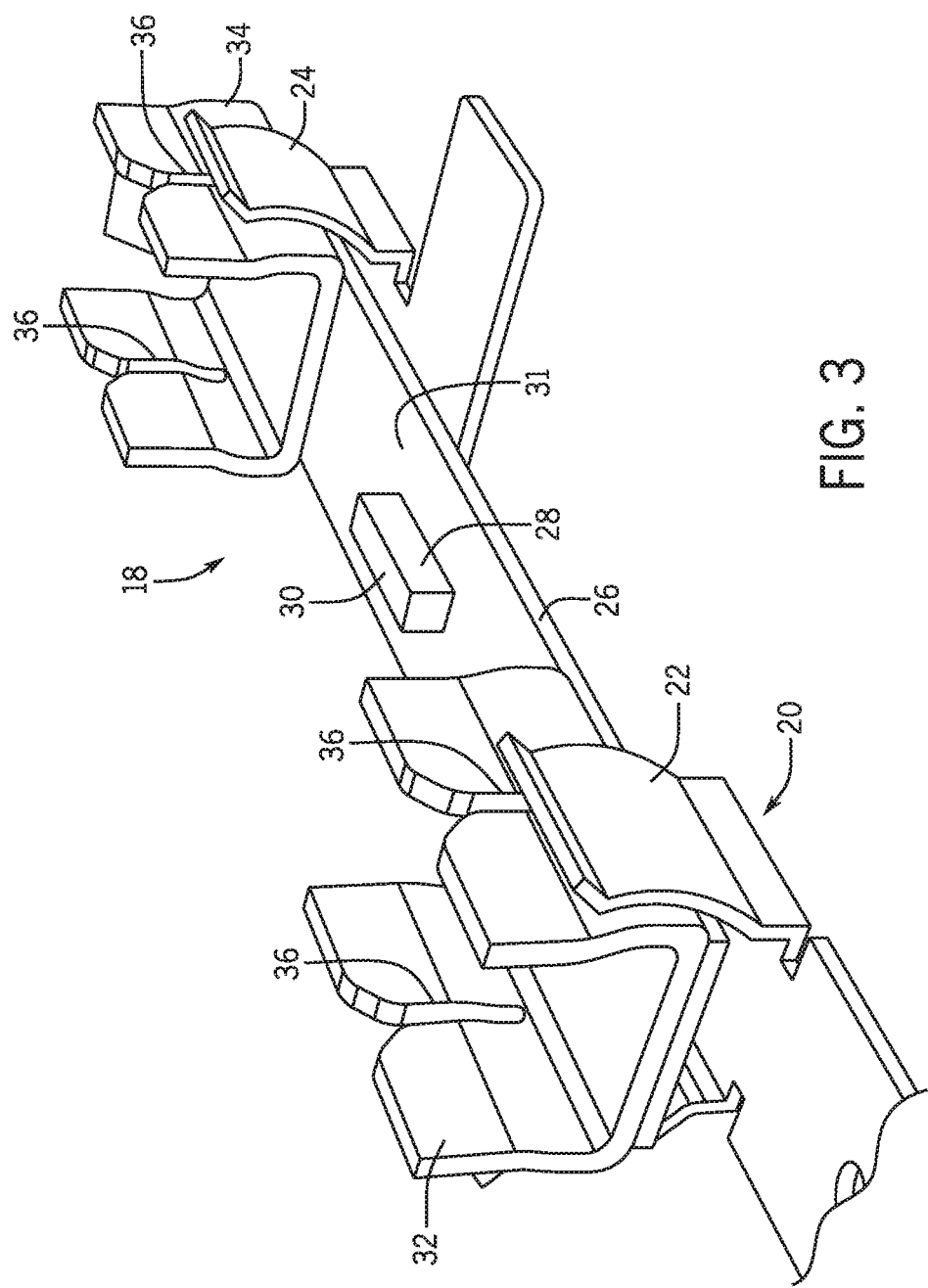
FIG. 3 is a perspective view of an embodiment of a lighting assembly that may be used in the vehicle sun visor of FIG. 1, in which the lighting assembly is disposed within a fuse bulb mount.

FIG. 3 is a perspective view of an embodiment of a lighting assembly 18 that may be used in the vehicle sun visor of FIG. 1, in which the lighting assembly 18 is disposed within a fuse bulb mount 20. In the illustrated embodiment, the fuse bulb mount 20 includes a first fuse bulb connector 22 and a second fuse bulb connector 24. Each fuse bulb connector may be formed from an electrically conductive material (e.g., metal) and electrically coupled to a power source, such as the vehicle battery and/or a battery disposed within the sun visor. For example, the first fuse bulb connector 22 may be electrically coupled to a positive terminal of the power source, and the second fuse bulb connector 24 may be electrically coupled to a negative terminal of the power source. Each fuse bulb connector is configured to couple a fuse bulb (e.g., an incandescent fuse bulb) to the fuse bulb mount 20 by capturing a respective end of the fuse bulb. The respective ends of the fuse bulb may include a conductive material (e.g., metal). Accordingly, while the fuse bulb is coupled to the fuse bulb mount 20, electrical power may be provided to the fuse bulb (e.g., a filament within an incandescent fuse bulb) via the fuse bulb connectors, thereby causing the fuse bulb to illuminate.

In the illustrated embodiment, the lighting assembly 18 is disposed within the fuse bulb mount 20 (e.g., instead of an incandescent fuse bulb). The lighting assembly 18 includes a circuit board 26 and a light-emitting diode (LED) 28 coupled to the circuit board 26. In the illustrated embodiment, the LED 28 (e.g., top-emitting LED) is configured to emit light from a light emitting surface 30, which is on an opposite side of the LED from a mounting surface 31 of the circuit board 26. Accordingly, the LED 28 may emit light in a direction away from the circuit board 26. However, in alternative embodiments, the LED (e.g., side-emitting LED) may be configured to emit light from a side surface (e.g., a surface perpendicular to the circuit board mounting surface 31), such that the light is emitted in a direction substantially parallel to the mounting surface 31 of the circuit board. For example, if a lens (e.g., transparent/translucent window) and/or light guide is positioned on an opposite side of the LED from the circuit board, the LED may be configured to emit light from the illustrated light emitting surface 30 through the lens/light guide. However, if the lens/light guide is positioned on a lateral side of the lighting assembly, the LED may be configured to emit light from a respective lateral side (e.g., side surface) of the LED.

While the illustrated lighting assembly 18 includes one LED 28, in alternative embodiments, additional LEDs may be mounted to the circuit board (e.g., 2, 3, 4, 5, 6, or more). For example, in certain embodiments, LEDs may be mounted on opposite sides of the circuit board to provide light to different regions of the vehicle interior (e.g., the LED 28 may output light to a lens proximate to a vanity mirror, and an LED on an opposite side of the circuit board from the LED 28 may output light toward a vehicle interior for an ambient lighting effect). Furthermore, the LED may be configured to emit any suitable light color, and/or the color of the mounting surface of the circuit board may be particularly selected to achieve a desired color output (e.g., based on the combination of light output by the LED and the light from the LED that reflects off the circuit board). In addition, labels and/or images may be printed on the circuit board.

The lighting assembly 18 also includes a first electrically conductive connector 32 coupled to the circuit board 26 (e.g., by a soldered connection, etc.) and a second electrically conductive connector 34 coupled to the circuit board 26 (e.g., by a soldered connection, etc.). Each electrically conductive connector is electrically coupled to the LED 28 (e.g., by a trace extending along the mounting surface 31 of the circuit board 26). In addition, each electrically conductive connector is configured to interface with a respective fuse bulb connector of the fuse bulb mount to couple the lighting assembly 18 to the fuse bulb mount 20 and to electrically couple the LED 28 to the respective fuse bulb connector. Accordingly, engagement of the first electrically conductive connector 32 with the first fuse bulb connector 22 and engagement of the second electrically conductive connector 34 with the second fuse bulb connector 24 establishes an electrical connection between the LED 28 and the power source (e.g., upon activation of a switch that controls illumination of the LED). As discussed in detail below, the shape of each electrically conductive connector is particularly configured to engage the respective fuse bulb connector to facilitate coupling the lighting assembly 18 to the fuse bulb mount 20. Accordingly, the lighting assembly 18 is configured to replace an incandescent fuse bulb, which the fuse bulb mount 20 is configured to support.

In the illustrated embodiment, each electrically conductive connector includes an interface, such as the illustrated slot 36, configured to couple a respective electrical conductor to the electrically conductive connector. Accordingly, the lighting assembly may be disposed within a lighting assembly mount particularly configured to retain the illustrated lighting assembly 18, and an electrical conductor may be connected to each electrically conductive connector via the interface to provide electrical power to the lighting assembly. Therefore, the lighting assembly may be used both as a replacement for an incandescent fuse bulb and as a dedicated LED lighting module. As a result, the costs and complexity associated with designing and manufacturing an LED fuse bulb replacement and a dedicated LED lighting module may be substantially reduced.

While each electrically conductive connector includes two slots 36 in the illustrated embodiment, in other embodiments, at least one electrically conductive connector may include a single slot (e.g., on one lateral side of the electrically conductive connector). Furthermore, in certain embodiments at least one electrically conductive connector may include three or more slots (e.g., to accommodate multiple electrical conductors). In addition, while each interface of the electrically conductive connectors includes a slot 36 in the illustrated embodiment, in other embodiments, at least one electrically conductive connector may include another suitable type of interface configured to electrically couple the electrical conductor to the electrically conductive connector. For example, the interface may include a screw configured to secure the electrical conductor to the electrically conductive connector, or a stab connector configured to secure the electrical conductor to the electrically conductive connector, among other suitable types of interfaces (e.g., clamp, crimp, etc.).

Furthermore, while the illustrated lighting assembly 18 includes two electrically conductive connectors, in alternative embodiments, the lighting assembly may include more or fewer electrically conductive connectors (e.g., 1, 2, 3, 4, 5, 6, or more). Furthermore, while the LED and the electrically conductive connectors are coupled to the circuit board in the illustrated embodiment, in certain embodiments, other components may be coupled to the circuit board, and/or electrical circuits may be formed on the circuit board. For example, in certain embodiments, a constant current circuit (e.g., a circuit configured to regulate the current supplied to the LED), a polarity neutral circuit (e.g., a circuit configured to enable either electrically conductive connector to be engaged with the first and second fuse bulb connectors), an electrostatic discharge protection circuit, or a combination thereof, among other suitable circuits, may be formed on the circuit board. Furthermore, while only one lighting assembly is shown in the illustrated embodiment, in certain embodiments, multiple lighting assemblies may be utilized throughout the vehicle interior (e.g., one or more lighting assemblies may be utilized within each sun visor).

Figure 4:
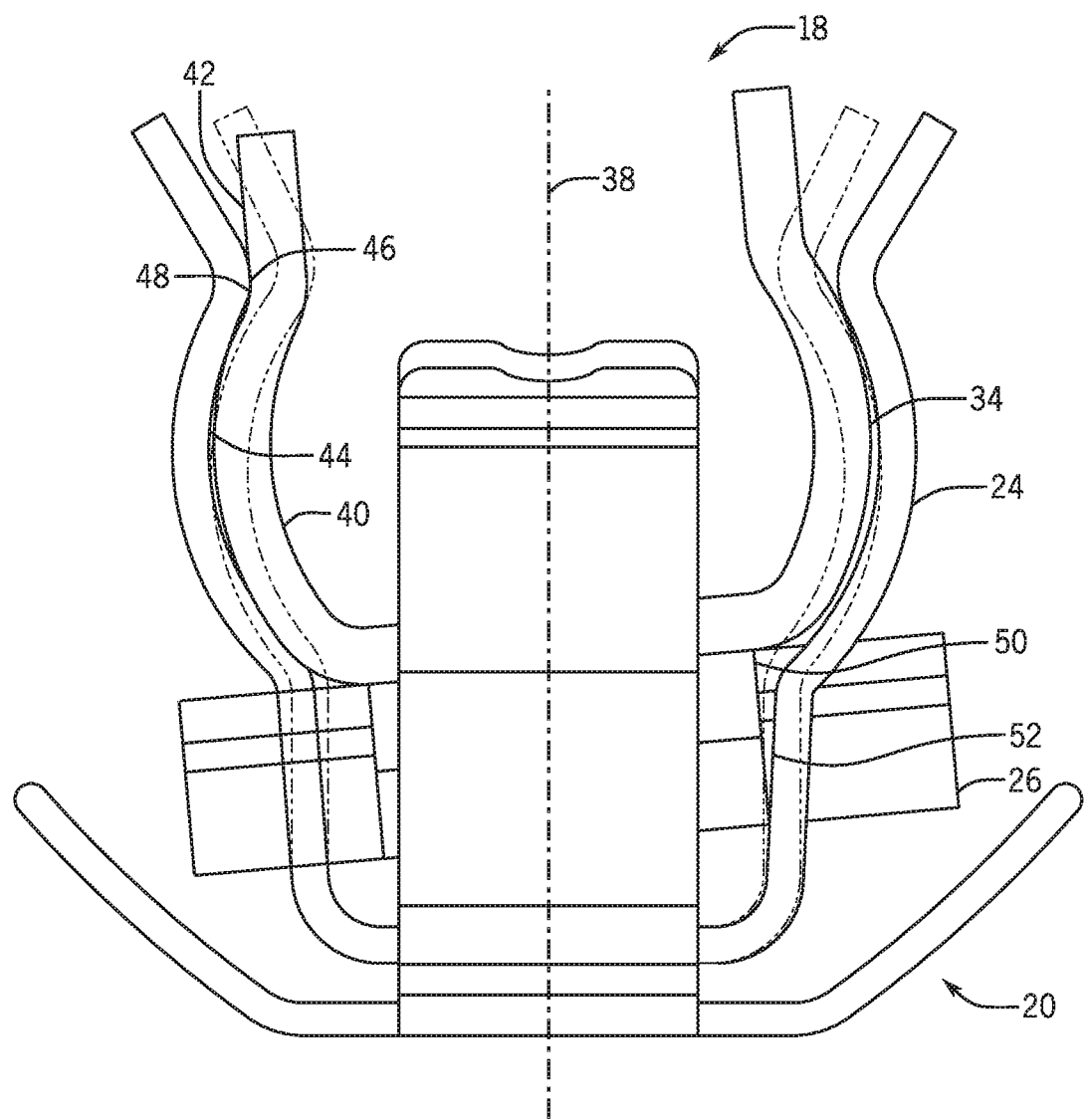
FIG. 4 is a side view of the lighting assembly of FIG. 3, in which the lighting assembly is rotated relative to the fuse bulb mount.

FIG. 4 is a side view of the lighting assembly 18 of FIG. 3, in which the lighting assembly 18 is rotated relative to the fuse bulb mount 20. As illustrated, the lighting assembly is rotated about 5 degrees relative to a vertical axis 38 of the fuse bulb mount 20. In the illustrated embodiment, each electrically conductive connector, such as the illustrated second electrically conductive connector 34, includes a curved portion 40 and an angled portion 42 (e.g., substantially flat portion) extending from the curved portion 40. The curved portion 40 is configured to interface with a corresponding curved portion 44 of the respective fuse bulb connector, such as the illustrated second fuse bulb connector 24. In addition, the curved portion 40 and the angled portion 42 form a recess 46 configured to interface with a corresponding protrusion 48 of the fuse bulb connector. Furthermore, the circuit board 26 includes a wall 50 configured to contact an interface portion 52 (e.g., substantially flat portion) of the fuse bulb connector on an opposite side of the vertical axis 38 from the recess/protrusion contact point. Contact between the protrusion and the recess, and contact between the wall and the interface portion substantially blocks rotation of the lighting assembly relative to the fuse bulb mount. Accordingly, the light output from the LED may be directed in a target direction (e.g., toward a lens of a sun visor lighting system, toward a light guide of the sun visor lighting system, etc.).

In the illustrated embodiment, the circuit board includes a second wall positioned on an opposite lateral side of the circuit board from the first wall (e.g., on an opposite side of the vertical axis 38 from the first wall), and the electrically conductive connector includes a second curved portion and a second angled portion (e.g., second substantially flat portion) forming a second recess on an opposite lateral side of the electrically conductive connector from the first recess (e.g., on an opposite side of the vertical axis 38 from the first recess). Contact between a second protrusion of the fuse bulb connector and the second recess, and contact between the second wall and a second interface portion of the fuse bulb connector may substantially block rotation of the lighting assembly relative to the fuse bulb mount (e.g., in an opposite direction from the illustrated direction of rotation). While the second electrically conductive connector 34 and the second fuse bulb connector 24 are shown in FIG. 4, in certain embodiments, the first electrically conductive connector and the first fuse bulb connector may have substantially similar features and may function in a substantially similar manner. However, in further embodiments, the first electrically conductive connector and/or the first fuse bulb connector may have other suitable configurations.

While each angled portion is substantially flat in the illustrated embodiment, in other embodiments, at least one angle portion may have another suitable shape (e.g., curved, polygonal, etc.). In addition, while each interface portion is substantially flat in the illustrated embodiment, in other embodiments, at least one interface portion may have another suitable shape (e.g., curved, polygonal, etc.). Furthermore, while the electrically conductive connector and the circuit board are configured to block rotation of the lighting assembly beyond 5 degrees relative to the vertical axis 38, in other embodiments, at least one electrically conductive connector and the circuit board may be configured to block rotation of the lighting assembly beyond another suitable angle (e.g., 1 degree, 2 degrees, 3 degrees, 4 degrees, 5 degrees, 6 degrees, or any other suitable angle). In addition, in certain embodiments, the lighting assembly may include other and/or additional anti-rotation element(s), such as protrusion(s), arm(s), cable(s), or a combination thereof, among other suitable anti-rotation elements. For example, in certain embodiments, at least one recess/protrusion interface and/or at least one wall/interface portion interface may be omitted. In further embodiments, the lighting assembly may not include anti-rotation elements, such as the illustrated recess/protrusion interface and the wall/interface portion interface, thereby enabling the lighting assembly to freely rotation relative to the fuse bulb mount. For example, in certain embodiments, the angled portion of the electrically conductive connector may be omitted (e.g., the electrically conductive connector may form a loop having the curved portion).

In addition, the curved portions of the electrically conductive connector are configured to interact with the corresponding curved portions of the fuse bulb connector to couple the lighting assembly to the fuse bulb mount. As illustrated, engagement of each electrically conductive connector with the respective fuse bulb connector induces the fuse bulb connector to expand from the state shown in light dashed lines to the state shown in black lines, thereby causing the fuse bulb connector to laterally expand and to apply a laterally inward force on the electrically conductive connector sufficient to retain the lighting assembly. While each curved portion has a substantially arcuate shape in the illustrated embodiment, in other embodiments, at least one curved portion may have another suitable shape (e.g., polygonal, etc.).

Figure 5:
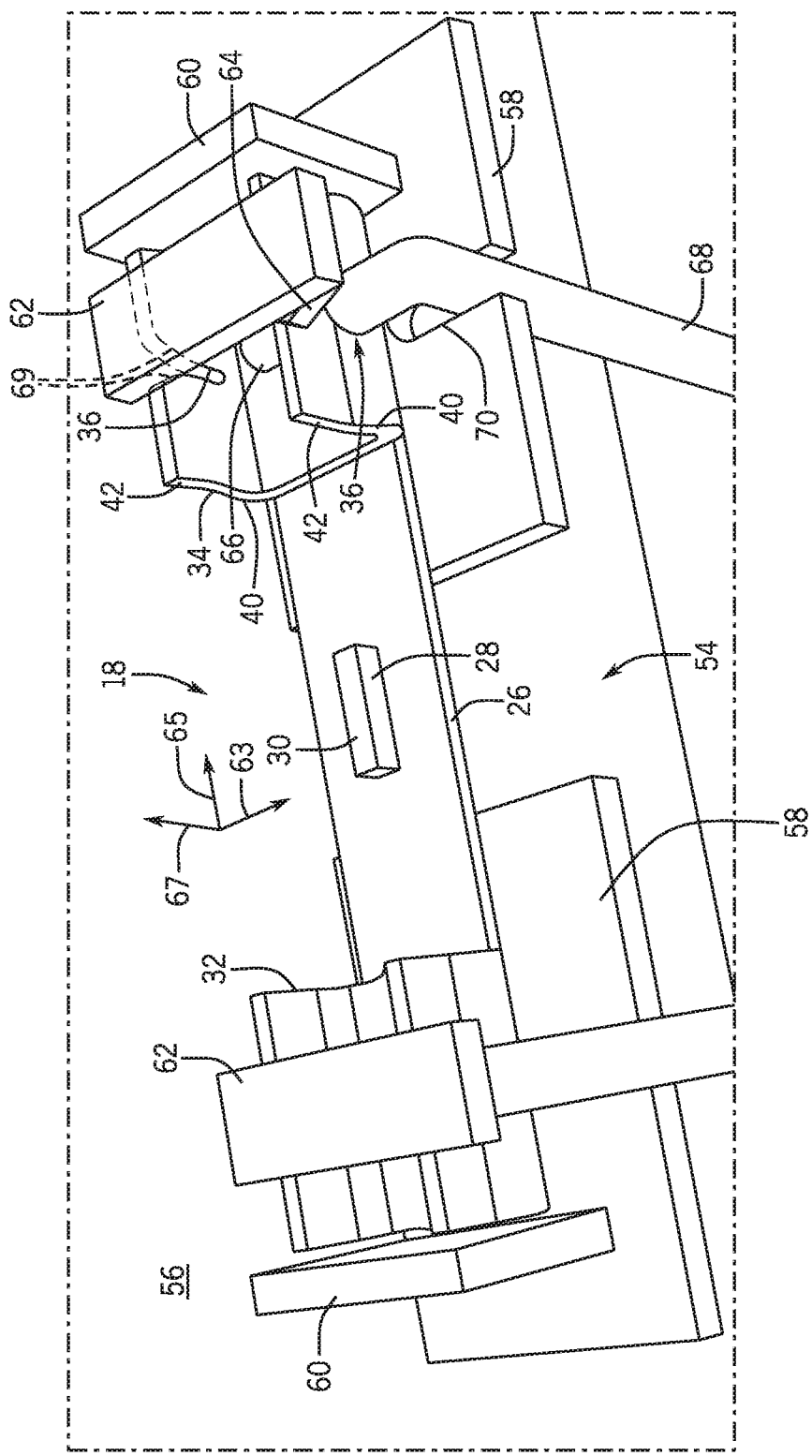
FIG. 5 is a perspective view of the lighting assembly of FIG. 3, in which the lighting assembly is disposed within a lighting assembly mount.

FIG. 5 is a perspective view of the lighting assembly 18 of FIG. 3, in which the lighting assembly 18 is disposed within a lighting assembly mount 54. In the illustrated embodiment, the lighting assembly mount 54 is formed by a core 56 of a sun visor, first retaining walls 58, second retaining walls 60, and clips 62. In the illustrated embodiment, the first retaining walls 58, the second retaining walls 60, and the clips 62 are integrally formed with the core 56 of the sun visor (e.g., via an injection molding process). However, in alternative embodiments, at least one of the components may be formed separately and coupled to the core. In the illustrated embodiment, the core 56 and protrusions 64 of the clips 62 are configured to block lateral movement of the lighting assembly 18 (e.g., movement of the lighting assembly 18 along a lateral axis 63) via contact with the electrically conductive connectors 32, 34. In addition, the second retaining walls 60 are configured to block longitudinal movement of the lighting assembly 18 (e.g., movement of the lighting assembly 18 along a longitudinal axis 65) via contact with the circuit board 26 and/or the electrically conductive connectors 32, 34. Furthermore, the first retaining walls 58 and the clips 62 are configured to block vertical movement of the lighting assembly 18 (e.g., movement of the lighting assembly 18 along a vertical axis 67) via contact with the circuit board 26 and the electrically conductive connectors, respectively. Accordingly, the lighting assembly mount 54 is configured to couple the lighting assembly 18 to the sun visor core 56. The lighting assembly mount 54 is also configured to direct the light emitting surface 30 of the LED 28 in a target direction (e.g., toward a lens and/or a light guide of the lighting system). While the illustrated lighting assembly mount 54 includes the core 56, the first retaining walls 58, the second retaining walls 60, and the clips 62, in alternative embodiments, the lighting assembly mount may include other components and/or additional components to couple the lighting assembly to the sun visor core (e.g., fastener(s), clamp(s), magnet(s), other wall(s), etc.).

As previously discussed, each electrically conductive connector includes two slots 36 each configured to couple an electrical conductor 66 to the electrically conductive connector. In the illustrated embodiment, each slot 36 extends through a respective angled portion 42 to a respective curved portion 40 of the electrically conductive connector. In addition, each angled portion 42 includes curved surfaces 69 configured to direct the electrical conductor 66 toward the respective slot 36. In certain embodiments, each angled portion 42 includes two curved surfaces 69. However, in other embodiments, at least one angled portion may include a single curved surface, or the curved surfaces may be omitted (e.g., such that the slot extends to the distal end of the electrically conductive connector, in embodiments in which the slot does not extend through the angled portion, etc.). Furthermore, in certain embodiments, the surface(s) configured to direct the electrical conductor to the slot may be flat, polygonal, or another suitable shape.

In the illustrated embodiment, the width of each slot 36 is less than or equal to the diameter of the wire 68 that includes the respective electrical conductor 66. Accordingly, driving the wire 68 into the slot 36 removes the insulation from the wire and establishes an electrical connection between the electrical conductor 66 and the electrically conductive connector. For example, to engage the lighting assembly 18 with the lighting assembly mount 54, each wire may be driven into one or more slots 36 of the respective electrically conductive connector. The lighting assembly 18 may then be disposed within the lighting assembly mount 54 (e.g., by moving the lighting assembly toward the core 56 along the lateral axis 63, such that contact between the electrically conductive connectors and angled portions of the protrusions 64 deform the clips 62, thereby enabling the lighting assembly to be engaged with the lighting assembly mount, as illustrated). In the illustrated embodiment, each first retaining wall 58 includes a recess 70 configured to facilitate passage of the respective wire 68. However, in alternative embodiments, the recess in at least one first retaining wall may be omitted.

The slots 36 enable the electrical conductors 66 to be connected to the electrically conductive connectors, thereby enabling electrical power to be provided (e.g., from a power source, such as a vehicle battery and/or a battery disposed within the sun visor) to the lighting assembly 18 (e.g., the LED 28 of the lighting assembly 18). For example, one electrical conductor may be electrically coupled to a positive terminal of the power source, and the other electrical conductor may be electrically coupled to a negative terminal of the power source. The interface (e.g., slot 36) on each electrically conductive connector enables the lighting assembly to receive electrical power while disposed within a lighting assembly mount particularly configured to retain the lighting assembly. Accordingly, the lighting assembly may be used both as a replacement for an incandescent fuse bulb and as a dedicated LED lighting module. As a result, the costs and complexity associated with designing and manufacturing an LED fuse bulb replacement and a dedicated LED lighting module may be substantially reduced.

Figure 6:
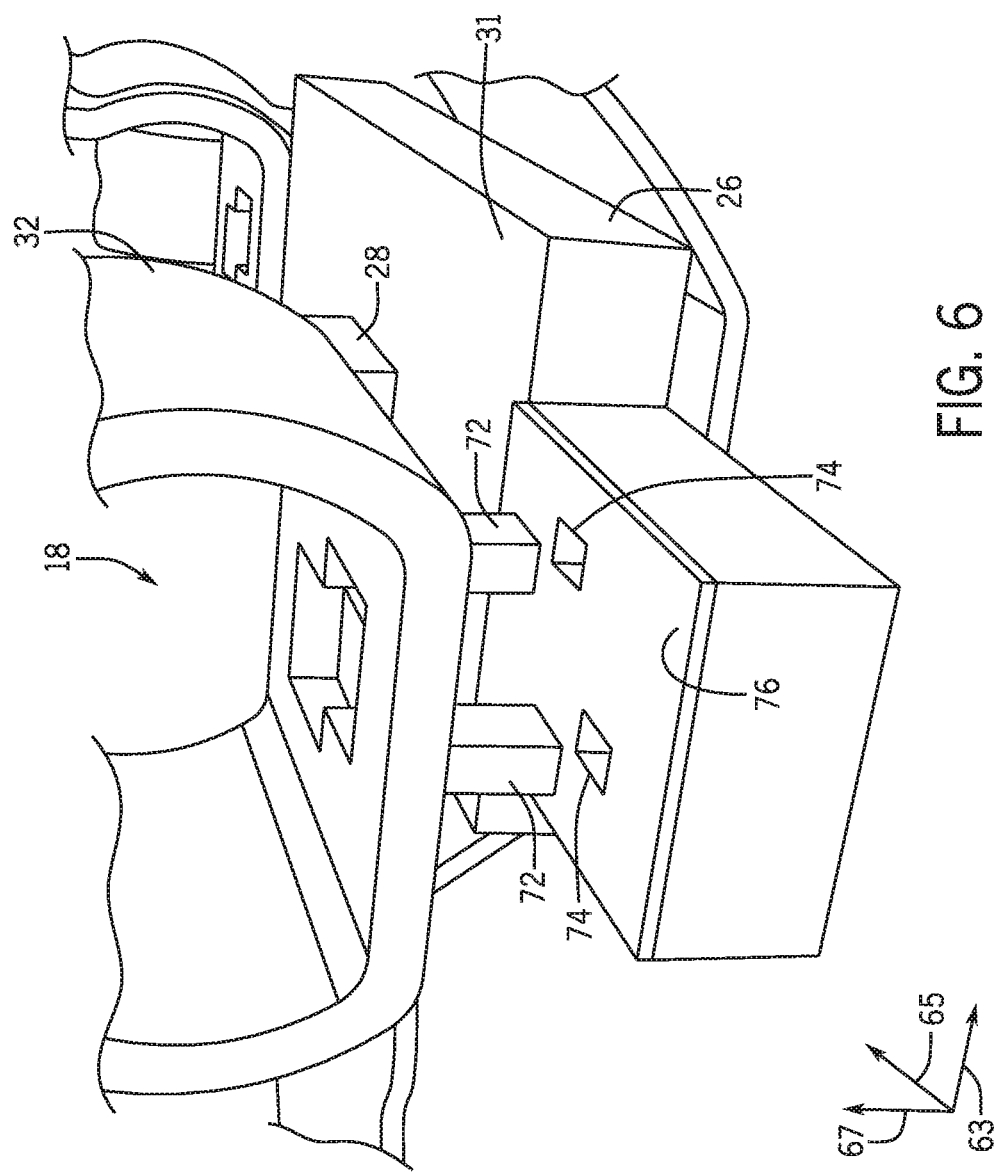
FIG. 6 is an exploded view of the lighting assembly of FIG. 3.

FIG. 6 is an exploded view of the lighting assembly 18 of FIG. 3. Each electrically conductive connector includes tabs 72 configured to engage recesses 74 in the circuit board 26 to facilitate alignment of the electrically conductive connector and the circuit board. While the illustrated first electrically conductive connector 32 includes two tabs, in alternative embodiments, at least one electrically conductive connector may include more or fewer tabs (e.g., 0, 1, 2, 3, 4, or more). In addition, in certain embodiments, at least one electrically conductive connector and/or the circuit board may include another suitable alignment element configured to align the electrically conductive connector with the circuit board (e.g., in addition to or as an alternative to the tab/recess interface).

Furthermore, each electrically conductive connector is coupled to the circuit board by a soldering process (e.g., wave soldering). For example, at least the first electrically conductive connector 32 may be soldered to a respective electrically conductive pad 76, which is electrically coupled to the LED (e.g., via a trace extending along the mounting surface 31 of the circuit board 26). Accordingly, an electrical path may be established between each electrically conductive connector and the LED. In certain embodiments, the LED 28, the electrically conductive connectors, and components of electrical circuits, if present, may be coupled to the circuit board by a "pick-and-place" machine, and then the components may be soldered to the circuit board (e.g., by a wave soldering machine). In certain embodiments, at least one electrically conductive connector may be coupled to the circuit board by another and/or an additional mounting system (e.g., a fastener, a clamp, etc.). Furthermore, in certain embodiments, a lens and/or a light guide may be positioned above the LED and may serve as a spacer to align the first and second electrically conductive connectors. In further embodiments, the circuit board and the LED may be over-molded with clear plastic to form a lens and/or a light guide. In such embodiments, the over-molded plastic may serve as a spacer to align the first and second electrically conductive connectors.

In certain embodiments, the thickness of the circuit board may be particularly selected to achieve a target rigidity. For example, in certain embodiments, the circuit board may be configured to flex, thereby enabling the circuit board to function as a switch (e.g., an electrically conductive pad on the circuit board may engage an electrical conductor on the core to selectively complete an electrical circuit that provides electrical power to the LED). By way of further example, the flexible circuit board may enable an actuator (e.g., mechanical actuator) to adjust the direction of the light output from the LED by flexing the circuit board. In addition, the lighting system may include an ambient light sensor (e.g., mounted to the circuit board) configured to enable control circuitry to adjust the brightness of the LED based on ambient lighting conditions. Furthermore, the lighting assembly may include a magnetic switch or a Hall effect switch (e.g., mounted to the circuit board) configured to selectively complete an electrical circuit that provides electrical power to the LED. In certain embodiments, the lighting assembly may include a speaker (e.g., mounted to the circuit board) configured to provide an audible output.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode, or those unrelated to enablement). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A lighting assembly for a vehicle interior, comprising:
an electrically conductive connector configured to couple to a circuit board and to electrically couple to a light-emitting diode (LED), wherein the electrically conductive connector is configured to interface with a fuse bulb connector of a fuse bulb mount to couple the lighting assembly to the fuse bulb mount and to electrically couple the LED to the fuse bulb connector, and the electrically conductive connector comprises an interface configured to couple an electrical conductor, separate from the fuse bulb connector and the lighting assembly, to the electrically conductive connector to enable electrical power to be provided to the lighting assembly.

2. The lighting assembly of claim 1, wherein the interface comprises a slot within the electrically conductive connector.

3. The lighting assembly of claim 2, wherein a width of the slot is configured to be less than or equal to a diameter of a wire that includes the electrical conductor.

4. The lighting assembly of claim 1, wherein the electrically conductive connector comprises a curved portion and an angled portion extending from the curved portion, the curved portion is configured to interface with a corresponding curved portion of the fuse bulb connector, and the curved portion of the electrically conductive connector and the angled portion form a recess configured to interface with a corresponding protrusion of the fuse bulb connector to block rotation of the lighting assembly relative to the fuse bulb mount.

5. The lighting assembly of claim 4, wherein the interface comprises a slot extending through the angled portion to the curved portion of the electrically conductive connector.

6. The lighting assembly of claim 5, wherein the angled portion comprises a curved surface configured to direct the electrical conductor toward the slot.

7. The lighting assembly of claim 1, wherein the electrically conductive connector comprises a tab configured to engage a recess within the circuit board to align the electrically conductive connector with the circuit board.

8. A lighting assembly for a vehicle interior, comprising:
a circuit board;
a light-emitting diode (LED) coupled to the circuit board; and
an electrically conductive connector coupled to the circuit board and electrically coupled to the LED, wherein the electrically conductive connector is configured to interface with a fuse bulb connector of a fuse bulb mount to couple the lighting assembly to the fuse bulb mount and to electrically couple the LED to the fuse bulb connector, and the electrically conductive connector comprises an interface configured to couple an electrical conductor, separate from the fuse bulb connector and the lighting assembly, to the electrically conductive connector to enable electrical power to be provided to the lighting assembly.

9. The lighting assembly of claim 8, wherein the interface comprises a slot within the electrically conductive connector.

10. The lighting assembly of claim 9, wherein a width of the slot is configured to be less than or equal to a diameter of a wire that includes the electrical conductor.

11. The lighting assembly of claim 8, wherein the electrically conductive connector comprises a curved portion and an angled portion extending from the curved portion, the curved portion is configured to interface with a corresponding curved portion of the fuse bulb connector, and the curved portion of the electrically conductive connector and the angled portion form a recess configured to interface with a corresponding protrusion of the fuse bulb connector to block rotation of the lighting assembly relative to the fuse bulb mount.

12. The lighting assembly of claim 11, wherein the interface comprises a slot extending through the angled portion to the curved portion of the electrically conductive connector.

13. The lighting assembly of claim 12, wherein the angled portion comprises a curved surface configured to direct the electrical conductor toward the slot.

14. The lighting assembly of claim 8, wherein the circuit board comprises a wall configured to contact an interface portion of the fuse bulb connector to block rotation of the lighting assembly relative to the fuse bulb mount.

15. The lighting assembly of claim 8, wherein the circuit board comprises a recess, the electrically conductive connector comprises a tab, and the tab is engaged with the recess to align the electrically conductive connector with the circuit board.

16. A lighting assembly for a vehicle interior, comprising:
a circuit board;
a light-emitting diode (LED) coupled to the circuit board;
a first electrically conductive connector coupled to the circuit board and electrically coupled to the LED, wherein the first electrically conductive connector is configured to interface with a first fuse bulb connector of a fuse bulb mount to couple the lighting assembly to the fuse bulb mount and to electrically couple the LED to the first fuse bulb connector, and the first electrically conductive connector comprises a first interface configured to couple a first electrical conductor, separate from the first fuse bulb connector and the lighting assembly, to the first electrically conductive connector to enable electrical power to be provided to the lighting assembly; and
a second electrically conductive connector coupled to the circuit board and electrically coupled to the LED, wherein the second electrically conductive connector is configured to interface with a second fuse bulb connector of the fuse bulb mount to couple the lighting assembly to the fuse bulb mount and to electrically couple the LED to the second fuse bulb connector, and the second electrically conductive connector comprises a second interface configured to couple a second electrical conductor, separate from the second fuse bulb connector and the lighting assembly, to the second electrically conductive connector to enable the electrical power to be provided to the lighting assembly.

17. The lighting assembly of claim 16, wherein the first interface comprises a first slot, the second interface comprises a second slot, or a combination thereof.

18. The lighting assembly of claim 16, wherein the first electrically conductive connector comprises a first curved portion and a first angled portion extending from the first curved portion, the first curved portion is configured to interface with a corresponding first curved portion of the first fuse bulb connector, and the first curved portion of the first electrically conductive connector and the first angled portion form a first recess configured to interface with a corresponding first protrusion of the first fuse bulb connector to block rotation of the lighting assembly relative to the fuse bulb mount; and wherein the second electrically conductive connector comprises a second curved portion and a second angled portion extending from the second curved portion, the second curved portion is configured to interface with a corresponding second curved portion of the second fuse bulb connector, and the second curved portion of the second electrically conductive connector and the second angled portion form a second recess configured to interface with a corresponding second protrusion of the second fuse bulb connector to block rotation of the lighting assembly relative to the fuse bulb mount.

19. The lighting assembly of claim 16, wherein the circuit board comprises a wall configured to contact an interface portion of the first fuse bulb connector and an interface portion of the second fuse bulb connector to block rotation of the lighting assembly relative to the fuse bulb mount.

20. The lighting assembly of claim 16, wherein the circuit board comprises a first recess and a second recess, the first electrically conductive connector comprises a first tab, the second electrically conductive connector comprises a second tab, the first tab is engaged with the first recess to align the first electrically conductive connector with the circuit board, and the second tab is engaged with the second recess to align the second electrically conductive connector with the circuit board.

* * * * *